United States Patent
Schwartz

(10) Patent No.: US 10,421,532 B2
(45) Date of Patent: Sep. 24, 2019

(54) CONNECTING ROD FOR A FLIGHT CONTROL SURFACE ACTUATION SYSTEM

(71) Applicant: GOODRICH ACTUATION SYSTEMS SAS, Buc (FR)

(72) Inventor: Laurent Schwartz, Orsay (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 198 days.

(21) Appl. No.: 14/933,012

(22) Filed: Nov. 5, 2015

(65) Prior Publication Data
US 2016/0129991 A1    May 12, 2016

(30) Foreign Application Priority Data
Nov. 6, 2014   (EP) ..................... 14306780

(51) Int. Cl.
*B64C 13/30* (2006.01)
(52) U.S. Cl.
CPC .................. *B64C 13/30* (2013.01)
(58) Field of Classification Search
CPC ......... B64C 13/30; B64C 13/28; B64C 13/10; B64C 13/34; B64C 13/00; B64C 13/38; E05F 15/622; G01L 5/103; B64D 2045/001; B64D 2045/0085; G01D 15/00; G01D 21/00
See application file for complete search history.

(56) References Cited

U.S. PATENT DOCUMENTS

| | | | | |
|---|---|---|---|---|
| 2,909,764 A | * | 10/1959 | Chambers | B64C 9/02 244/129.1 |
| 3,203,275 A | * | 8/1965 | Hoover | B64C 13/34 244/99.2 |
| 4,784,355 A | * | 11/1988 | Brine | B64C 9/20 244/213 |
| 4,823,617 A | * | 4/1989 | Hase | G01L 3/102 73/862.335 |
| 5,098,043 A | * | 3/1992 | Arena | B64C 13/26 244/215 |
| 5,686,907 A | * | 11/1997 | Bedell | B64D 45/0005 244/194 |
| 6,311,566 B1 | | 11/2001 | Ferguson | |
| 2005/0178215 A1 | | 8/2005 | Mayer | |
| 2007/0204699 A1 | * | 9/2007 | Salvo | F16B 31/02 73/761 |

(Continued)

FOREIGN PATENT DOCUMENTS

| EP | 1462361 A1 | 9/2004 |
|---|---|---|
| EP | 2570691 A1 | 3/2013 |

(Continued)

OTHER PUBLICATIONS

European Search Report for application No. EP14306780.9; dated May 11, 2015, 8 pages.

*Primary Examiner* — Medhat Badawi
*Assistant Examiner* — Vicente Rodriguez
(74) *Attorney, Agent, or Firm* — Cantor Colburn LLP

(57) ABSTRACT

A connecting rod assembly for a flight control surface actuation system, the assembly comprising a connecting rod for connecting a flight control surface to a rotary actuator and a position sensor mounted to the connecting rod for sensing the position of the connecting rod relative to a rotary actuator.

11 Claims, 4 Drawing Sheets

(56) References Cited

U.S. PATENT DOCUMENTS

| | | |
|---|---|---|
| 2009/0212167 A1 | 8/2009 | Kunz |
| 2010/0059633 A1* | 3/2010 | Pohl ............................ B64C 9/16 244/215 |
| 2010/0250047 A1 | 9/2010 | Balasu |
| 2012/0325976 A1 | 12/2012 | Parker |
| 2013/0241539 A1* | 9/2013 | Wolschlager ............ G01D 1/00 324/207.25 |
| 2013/0283942 A1* | 10/2013 | Bouillot ............. B64D 45/0005 74/89 |
| 2014/0097780 A1 | 4/2014 | Panzer |

FOREIGN PATENT DOCUMENTS

| | | |
|---|---|---|
| IL | 195777 A | 2/2012 |
| JP | 2003112693 A | 4/2003 |
| WO | 2005079460 A2 | 9/2005 |
| WO | 2007074173 A2 | 7/2007 |
| WO | 2007140147 A2 | 12/2007 |
| WO | 2011134799 A1 | 11/2011 |
| WO | 2012031759 A2 | 3/2012 |

* cited by examiner

CONNECTING ROD FOR A FLIGHT CONTROL SURFACE ACTUATION SYSTEM

FOREIGN PRIORITY

This application claims priority to European Patent Application No. 14306780.9 filed Nov. 6, 2014, the entire contents of which is incorporated herein by reference.

TECHNICAL FIELD

The present disclosure relates to a flight control surface actuation system and a connecting rod for use in such a system.

BACKGROUND

It is known to use rotary actuators to control the position of flight control surfaces on an aircraft. An example of a flight control surface is a spoiler, which is positioned on a trailing edge of an aircraft wing. The spoiler can be extended upwardly, from a stowed position flush to the wing to a raised position, to reduce the lift created by the wing. In order to connect the rotary output shaft to the flight control surface, it is common to use an elongate connecting rod.

In prior art rotary actuators, it is known to provide some sort of position sensor on the actuator output shaft to determine the angular displacement thereof, which in turn, allows the position of the flight control surface to be determined.

SUMMARY

There is disclosed herein a connecting rod assembly for a flight control surface actuation system, the assembly comprising a connecting rod for connecting a flight control surface to a rotary actuator and a position sensor mounted to the connecting rod for sensing the position of the connecting rod relative to a rotary actuator.

Providing a position sensor on the connecting rod may mean that a position sensor will not need to be provided in or on the rotary actuator. It may be easier to access and/or replace a position sensor on a connecting rod than one that is inside (or attached to) an actuator.

The term 'connecting' should be understood to refer to any type of direct or indirect connection. In an indirect connection between two parts, the connection may be via one or more intervening members that are connected to one or both of the two parts.

The position sensor may be any type of sensor that is operable to determine the relative position, in use, between the connecting rod and a rotary actuator connected thereto.

The term 'connecting rod' should be understood to refer to an elongated member that is configured to be operatively connected between a flight control surface and a rotary actuator, in such a way that the output motion of the actuator can be transmitted by the rod to extend (i.e. open) and/or retract (i.e. close) the flight control surface.

The term 'operatively connected' should be understood to refer to connection of two parts in such a way that one of the parts can operate the other and possibly vice versa. For example, one part may drive the other in some way. As such, two parts that are operatively connected may be indirectly connected to each other.

The position sensor may be arranged to measure a rotation of the connecting rod relative to a rotary actuator. As such, the sensor may be a rotation sensor. The position sensor may measure the rotation of a certain part, or the whole, of the rod.

The connecting rod may comprise a first end and a second end. The first end may be configured to be operatively connected to a rotary actuator and the second end may be configured to be operatively connected to a flight control surface.

The connecting rod may comprise first and second rod arms, which extend parallel to each other towards the first end.

The position sensor may measure the rotation of the first end of the rod about the axis of rotation of the rotational actuator.

A first part of the position sensor may be secured to the connecting rod in a fixed position (i.e. so that it moves with the rod, not relative thereto), which may be at or near the first end of the rod. A second part of the position sensor may be rotatably mounted to the first part and the position sensor may be configured to measure the relative rotation between the first and second parts.

The second part may be configured for connection to a rotary output shaft of a rotary actuator. As such, the position sensor may form part (or the whole) of the connection between the rod and the rotary output shaft.

The position sensor may be mounted to at least one of the connecting rod arms.

The position sensor may be any suitable type of sensor, such as a Hall-Effect sensor, a Rotary Variable Differential Transformer (RVDT) or a potentiometer.

The assembly may also comprise a load sensor mounted to the connecting rod for measuring a force exerted along the connecting rod. The load sensor may be able to measure both compressive and tensile forces along the rod.

The load sensor may be located adjacent the second end of the rod, but other locations may be suitable.

The load sensor may be any suitable type of sensor, such as a load cell, a strain gauge, a piezoelectric sensor, a semiconductor load sensor or a magnetostrictive load sensor.

The assembly may comprise an electronic module mounted to the connecting rod and configured to receive a first signal from the position and/or load sensor and transmit a second signal to a location remote from the connecting rod. The module may transmit the second signal wirelessly. The module may comprise wired connections between the load and/or position sensors, or alternatively, these connections may be wireless.

The module may transmit the second signal, e.g. wirelessly, to a flight control computer (e.g. in an aircraft cockpit) and/or to an electronic control unit of a rotary actuator. This provides a dynamic feedback loop for the control of the actuator based on the position of the connecting rod (and therefore the flight control surface).

The module may be positioned between the first and second connecting rod arms.

The present disclosure also extends to a flight control surface actuation system comprising a rotary actuator having an output shaft configured to rotate about an axis and a connecting rod assembly as described above. The connecting rod is operatively connected to the output shaft such that rotation of the output shaft about its axis causes at least part of the connection rod to rotate about the same axis.

The part of the rod that rotates about the axis may be the first end.

The position sensor may be arranged to measure the angular displacement of the first end of the connecting rod about the axis.

The second part of the position sensor may be configured to rotate with the output shaft relative to the first end of the connecting rod.

The second part of the position sensor may comprise a sensor shaft that is operatively connected to the actuator output shaft and that is rotatably mounted to the connecting rod. As such, the rod may rotate about the position sensor, and, in particular, about the sensor shaft. The position sensor measures the extent of this rotation.

The actuator output shaft may be connected to an output lever and the output lever may be connected to the connecting rod. In such an arrangement, the second part of the position sensor, e.g. the sensor shaft, is mounted to the output lever, and the rod is operatively connected to the output shaft via the position sensor (comprising the first and second parts) and the output lever.

The present disclosure also extends to a method of controlling a flight control surface comprising using the system described above to vary the position of a flight control surface.

The method may further comprise using the load and position sensor measurements to control the actuator.

The present disclosure also extends to an aircraft comprising at least one flight control surface and the assembly or system as described above, wherein the connecting rod is connected to the flight control surface.

The flight control surface may be a spoiler on an aircraft wing.

BRIEF DESCRIPTION OF THE DRAWINGS

An exemplary embodiment of the present disclosure will now be described by way of example only and with reference to FIGS. 1 to 4, of which.

SPECIFIC DESCRIPTION

Figure 1:
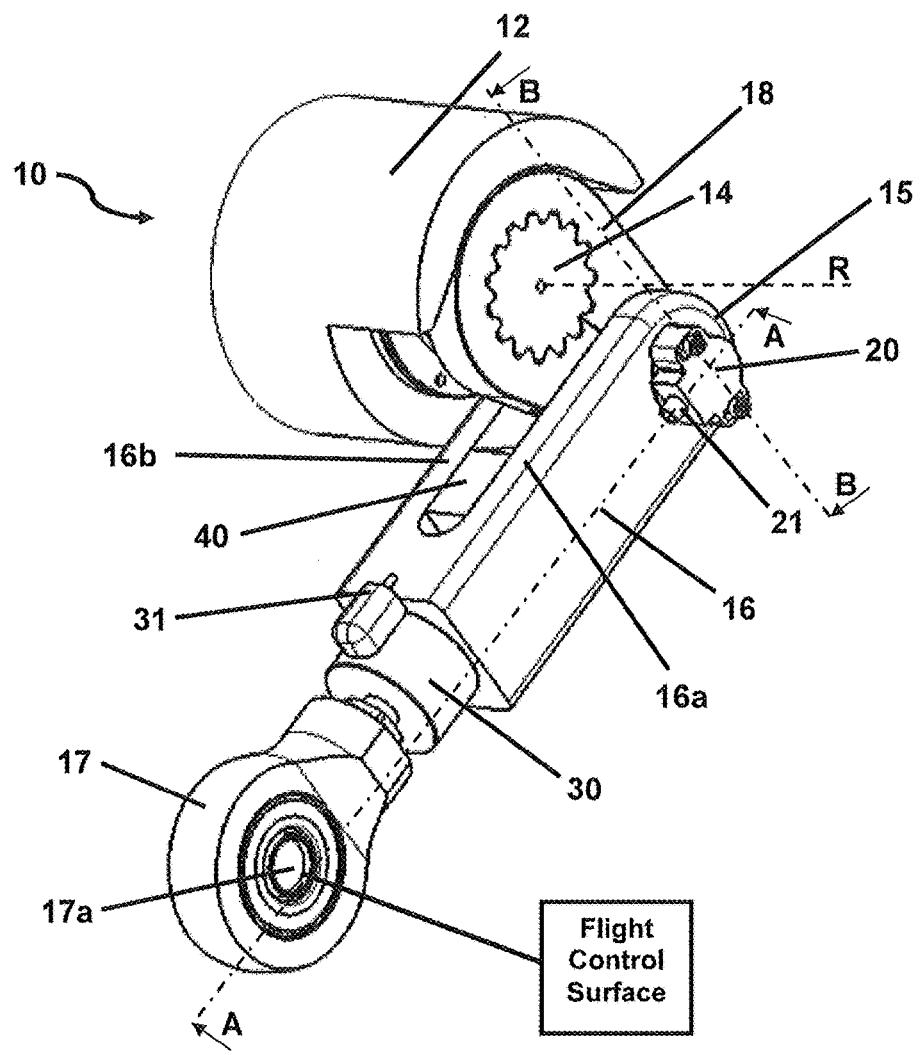
FIG. 1 is a perspective view of an exemplary flight control surface actuation system in accordance with an embodiment of the present disclosure.

FIG. 1 shows a flight control surface actuation system 10 according to an embodiment of the present disclosure. The system 10 comprises a rotary actuator 12 having a rotary output shaft 14 rotatable around an axis R. The shaft 14 is encircled by (and engaged with) an output lever 18.

A connecting rod 16 is used to control the position of a flight control surface (not shown) connected thereto, as is known in the art. The flight control surface may be, for example, a spoiler on an aircraft wing.

A first end 15 of the connecting rod 16 is rotatably connected to the output lever 18 and a second end 17 of the connecting rod 16 is configured to be connected to a flight control surface via an eye 17a.

It should be understood that the output lever 18 is only a feature of this specific embodiment, and that in alternative embodiments, the connecting rod 16 could be connected to the output shaft 14 directly, or via a plurality of output levers.

The connecting rod 16 has two arms 16a, 16b, which extend parallel to each other towards the first end 15 of the rod 16.

A position sensor 20 is mounted to the connecting rod 16 and to the output lever 18 and forms a connection therebetween. The position sensor is located adjacent to the first end 15 of the rod 16. In this embodiment, the position sensor 20 is mounted to rod arm 16a, but could be mounted to rod arm 16b.

The position sensor 20 is arranged to measure the position of the connecting rod 16 relative to the output lever 18 and thus relative to the rotational axis R of the rotary actuator 12. Measuring the position of the rod 16 about the axis R (i.e. the angular displacement of the first end 15 of the rod 16 relative to the axis) enables the extension of a flight control surface (not shown) connected to the rod 16 to be determined.

A load sensor 30 is mounted to the connecting rod 16 for measuring the load exerted on the connecting rod 16. In this embodiment, the load sensor 30 is located between the eye 17a and the rod arms 16a, 16b, but it should be understood that the load sensor could be located at any suitable point along the rod 16.

The load sensor 30 is configured to measure a force exerted along the rod 16 from the rotary actuator 12 towards the second end 17 and/or from a flight control surface towards the first end 15 via the eye 17a.

The load sensor 30 can be any appropriate sensor known in the art that generates a signal indicative of the load exerted on the connecting rod 16. Such sensors may include a load cell, a strain gauge, a piezoelectric sensor, a semiconductor load sensor or a magnetostrictive load sensor.

The position and load sensors 20, 30 each comprise a wire output port 21, 31 for receiving a wire (not shown) connected to an electronic module 40 located between the rod arms 16a, 16b. The electronic module 40 is configured to receive position and load signals from the sensors 20, 30 and transmit signals wirelessly or through wires (not shown) to a flight computer and/or to a control unit in the rotary actuator 12. This allows feedback from the sensors 20, 30 to be used in controlling the amount of actuation of a flight control surface. Mounting the electronic module 40 between the rod arms 16a and 16b is advantageous in that it acts to shields and protect it.

Figure 2:
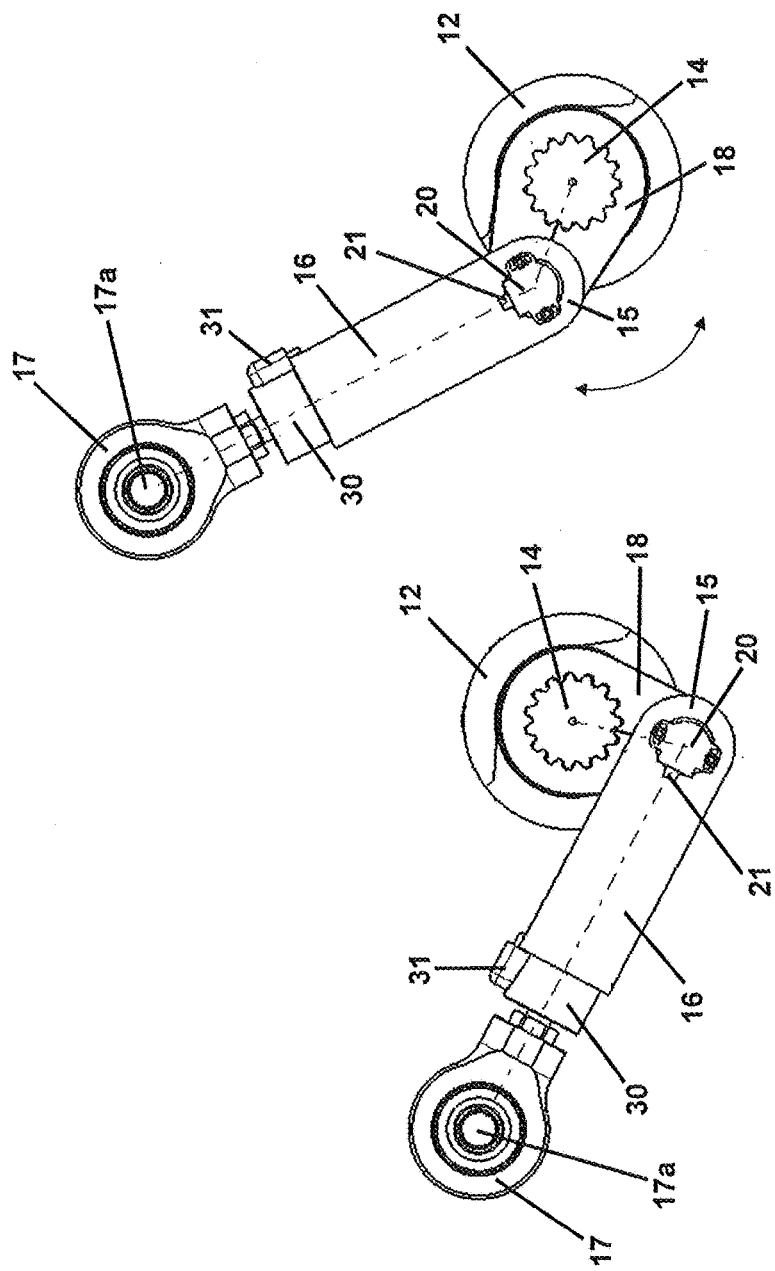
FIGS. 2a and 2b show side views of the actuation system of FIG. 1 in a retracted position and an extended position.

FIG. 2a shows the actuation system 10 in a retracted position and FIG. 2b shows the rod 16 in an extended position.

In operation, when flight control surface actuation is required, the rotary actuator 12 is activated to rotate output shaft 14 and output lever 18 around axis R. As described in more detail below in relation to FIGS. 3 and 4, the first end 15 of the connecting rod 16 is rotatably connected to the output lever 18 and the connecting rod 16 is free to rotate around this connection point, such that as the first end 15 rotates around the axis R due to the rotation of the output lever 18 the connecting rod 16 pivots at the connection point. When a flight control surface (not shown) is operatively connected to the second end 17 of the connecting rod 16, the rotation of the output shaft 14 and pivoting of the connecting rod 16 at the first end 15 allow movement of the connecting rod 16 upward (FIGS. 2a and 2b), causing the flight control surface to move from a first stowed position (where, for example, it is flush with an aircraft wing surface) to a second raised position, where, for example, it is extended upwardly from an aircraft wing surface.

Figure 3:
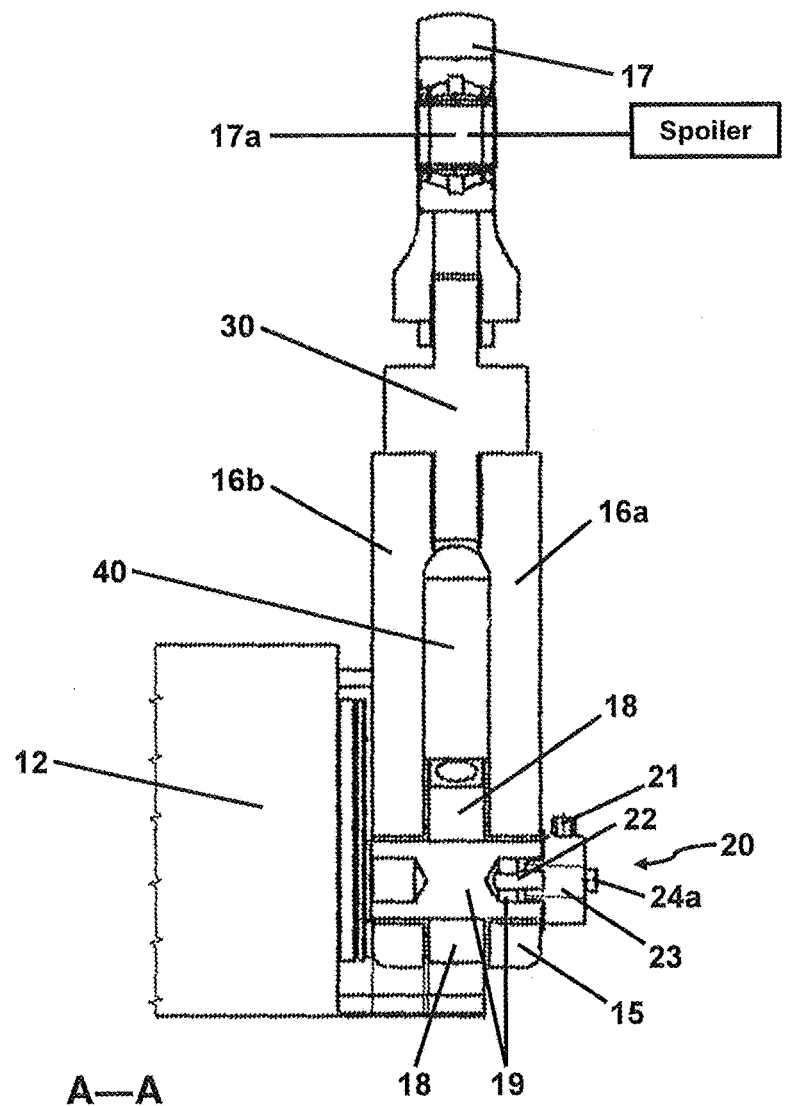
FIG. 3 shows a first cross-sectional view through the actuation systems of FIGS. 1 and 2.
Figure 4:
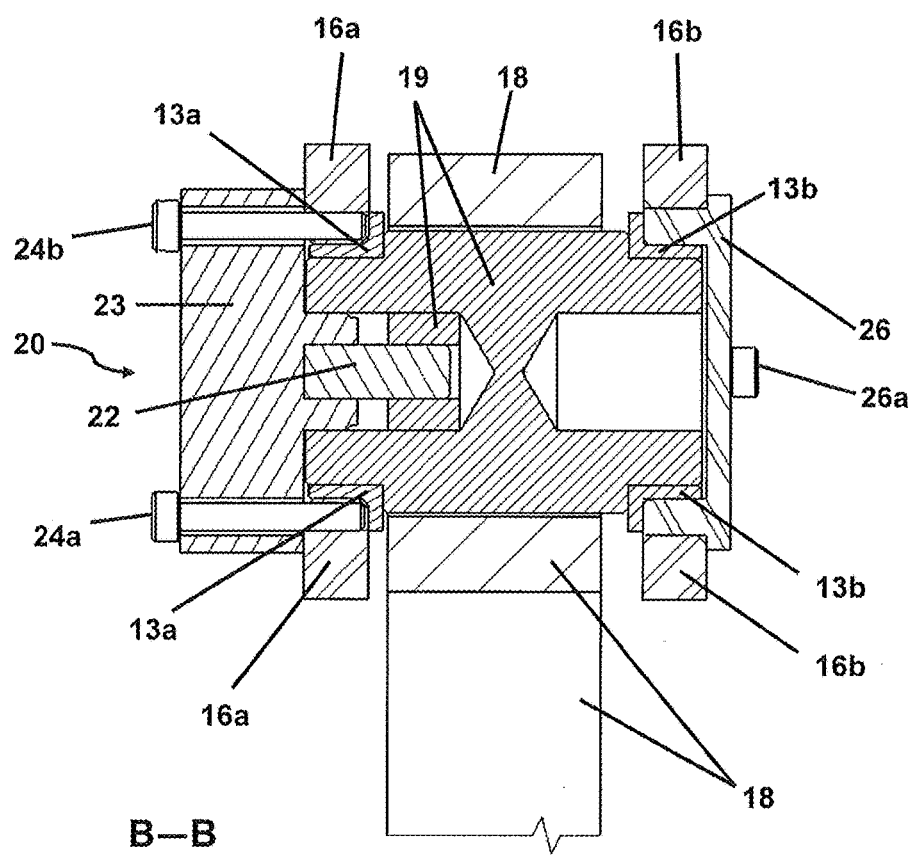
FIG. 4 shows a second cross-sectional view through the actuation systems of FIGS. 1 to 3.

FIGS. 3 and 4 show cross-sectional views through the system 10. In particular, FIG. 3 shows a cross-section through the length of the connecting rod 16, output lever 18 and position sensor 20 along line A-A (see FIG. 1) and FIG.

4 shows the cross-section through the connecting rod 16, output lever 18 and position sensor 20 along line B-B (see FIG. 1).

FIGS. 3 and 4 show the two connecting rod arms 16a, 16b each connected to an engagement part 19 of the output lever 18. Bearings 13a, 13b are mounted between the part 19 and rod arms 16a, 16b to allow the rod 16 to freely rotate about the output lever 18 at first end 15. The position sensor 20 comprises a housing 23, mounted to rod arm 16a in a fixed manner, so that it moves with the rod arm 16a, not relative thereto, using fasteners 24a and 24b, and a sensor shaft 22, rotatably connected to the housing 23. A cap 26 is also secured to second rod arm 16b through fastener 26a. The sensor shaft 22 engages with the output lever 18 at engagement part 19, and rotates with the output lever 18. During rotation of the sensor shaft 22, the housing 23 remains fixed to the connecting rod arm 16a, thus the sensor shaft 22 rotates relative to the housing 23. As the sensor shaft 22 rotates with the output lever 18 a signal indicative of the amount of rotation is generated by the position sensor 20, as is known in the art. This signal is used to indicate the position of the connecting rod 16 and, in turn, the flight control surface (not shown). In this embodiment, the position sensor 20 is a contactless Hall-effect sensor. However, any suitable position sensor may be used, for example, a Rotary Variable Differential Transformer (RVDT) or a potentiometer.

Mounting the load sensor 30 and position sensor 20 to the connecting rod 16 may remove the need for a sensor to be housed within or on the rotary actuator 12. This may reduce the size of the actuator 12 and make the sensors 20, 30 easier to access and replace. Furthermore, since the connecting rod 16 is loaded directly in tension/compression during use, integrating a load sensor 30 thereon allows easier and more accurate measurements thereof, without having to account for any actuator internal friction.

Although the figures and the accompanying description describe a particular embodiment, it is to be understood that the scope of this disclosure is not to be limited to such a specific embodiment, and is, instead, to be determined by the following claims.

The invention claimed is:

1. A flight control surface actuation system comprising:
   a rotary actuator having an output shaft configured to rotate about an axis;
   an output lever connected to the output shaft;
   a connecting rod comprising a first end and a second end, wherein the connecting rod is rotatably connected to the output lever at the first end such that the connecting rod pivots about the first end relative to the output lever; and
   a position sensor mounted to the connecting rod for sensing a position of the connecting rod relative to the rotary actuator, the output lever and the connecting rod are connected via the position sensor and the position sensor is arranged to measure an angular displacement of the first end of the connecting rod about the axis;
   wherein a first part of the position sensor is secured to the connecting rod in a fixed position, a second part of the position sensor is rotatably mounted to the first part and the position sensor is configured to measure the relative rotation between the first and second parts;
   wherein the second part of the position sensor is configured to rotate with the output shaft relative to the first end of the connecting rod, and comprises a sensor shaft that engages and rotates with the output lever and that is rotatably mounted to the connecting rod.

2. The system of claim 1, wherein the position sensor is arranged to measure a rotation of the connecting rod relative to the rotary actuator.

3. The system of claim 1, wherein the position sensor is a Hall-Effect sensor, a Rotary Variable Differential Transformer (RVDT) or a potentiometer.

4. The system of claim 1, further comprising a load sensor mounted to the connecting rod for measuring a force exerted along the connecting rod.

5. The system of claim 1, further comprising an electronic module mounted to the connecting rod and configured to receive a first signal from the position and transmit a second signal.

6. An aircraft comprising:
   at least one flight control surface; and
   the system of claim 1, wherein said connecting rod is connected to said flight control surface.

7. The aircraft of claim 6, wherein the flight control surface is a spoiler.

8. The system of claim 4, wherein the load sensor is a load cell, a strain gauge, a piezoelectric sensor, a semiconductor load sensor or a magnetostrictive load sensor.

9. The system of claim 5, wherein the second signal is transmitted wirelessly to a location remote from the connecting rod.

10. The system of claim 4, further comprising an electronic module mounted to the connecting rod and configured to receive a first signal from the load sensor and transmit a second signal.

11. The system of claim 10, wherein the second signal is transmitted wirelessly to a location remote from the connecting rod.

* * * * *